Figure 1:
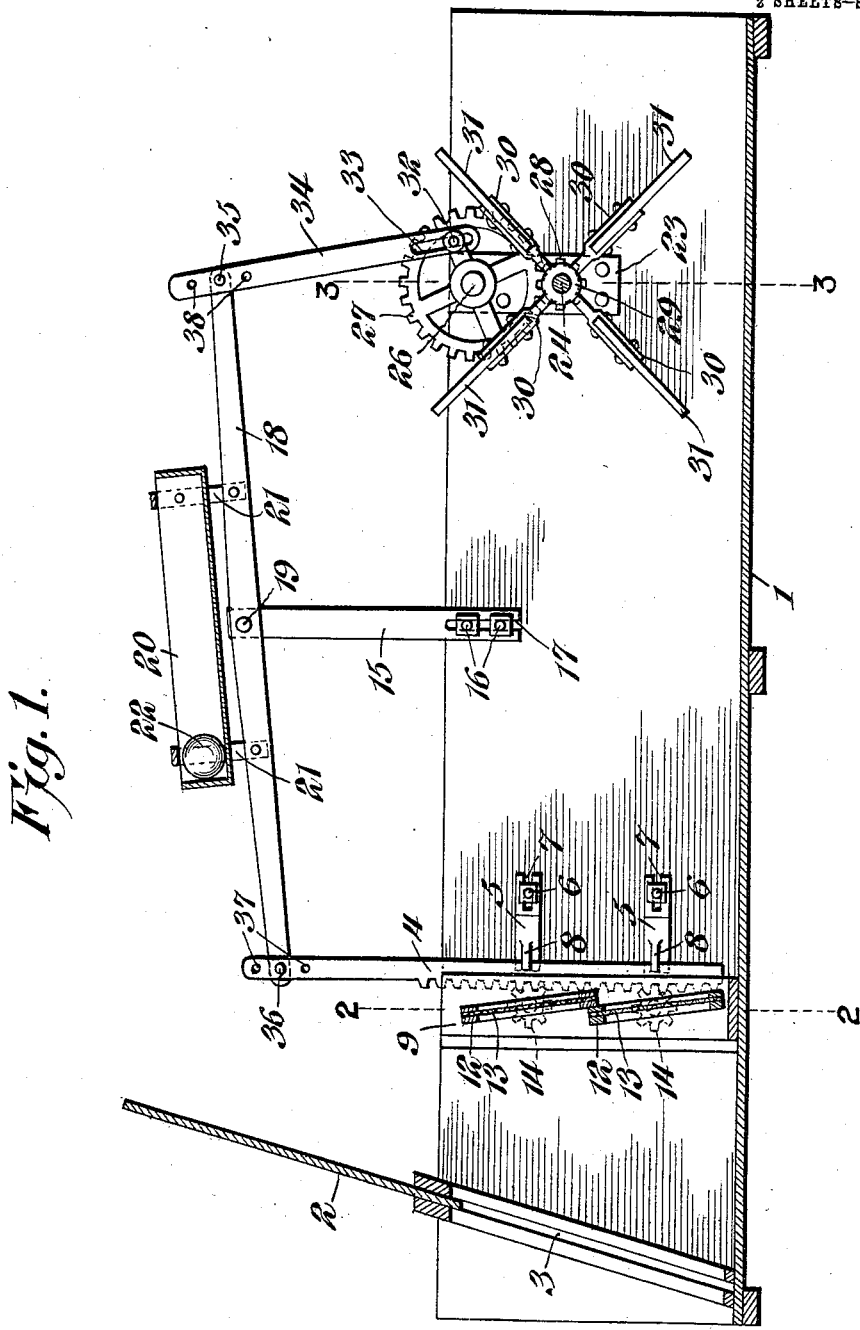

B. J. ROWLEY.
FISH SCREEN FOR WATER CHUTES.
APPLICATION FILED OCT. 10, 1910.

988,033.

Patented Mar. 28, 1911.

2 SHEETS—SHEET 1.

WITNESSES

Benjamin J. Rowley, INVENTOR

BY

ATTORNEY

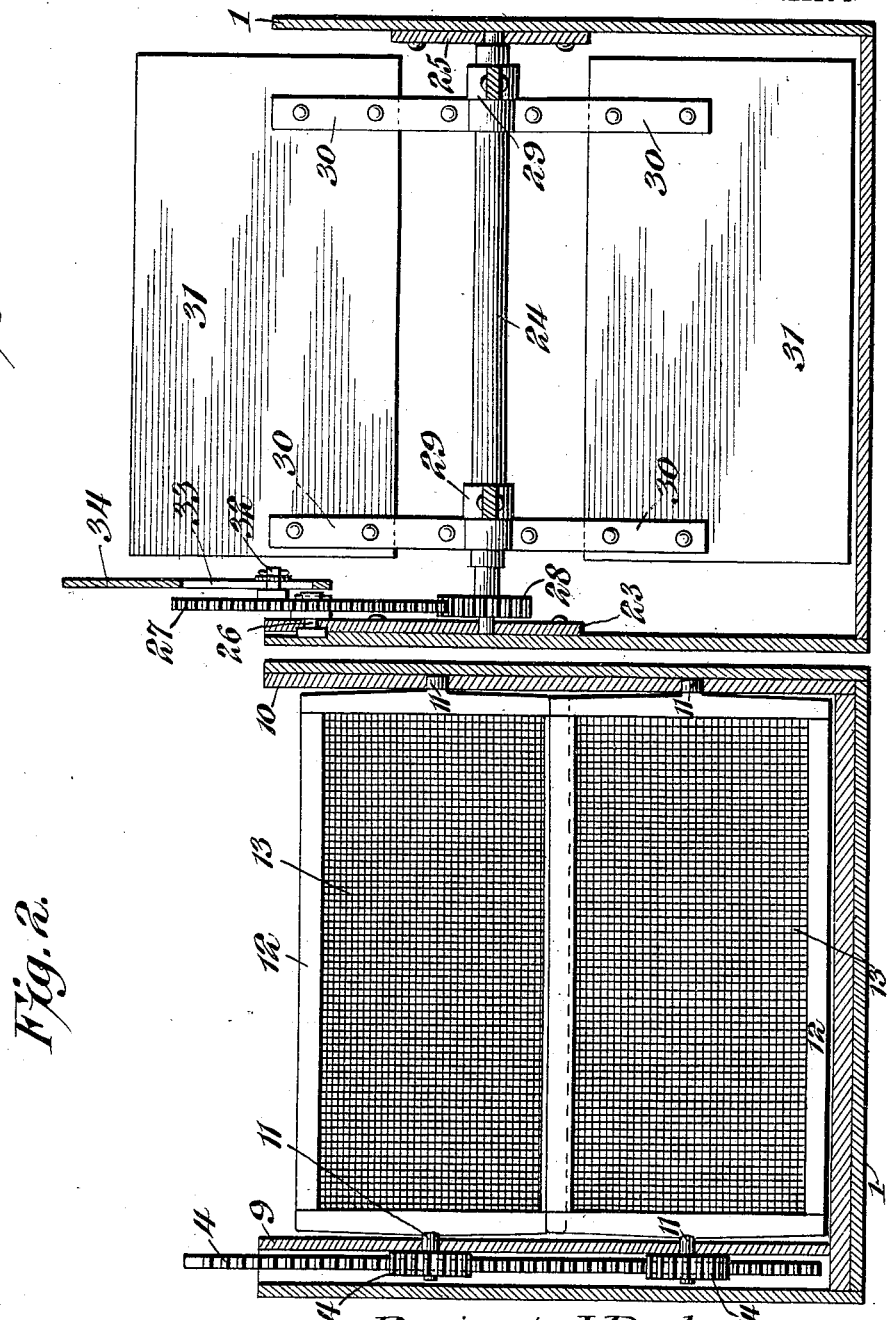

UNITED STATES PATENT OFFICE.

BENJAMIN J. ROWLEY, OF TWISP, WASHINGTON.

FISH-SCREEN FOR WATER-CHUTES.

988,033.　　　　　Specification of Letters Patent.　　Patented Mar. 28, 1911.

Application filed October 10, 1910.　Serial No. 586,354.

*To all whom it may concern:*

Be it known that I, BENJAMIN J. ROWLEY, a citizen of the United States, residing at Twisp, in the county of Okanogan and State of Washington, have invented a new and useful Fish-Screen for Water-Chutes, of which the following is a specification.

This invention has reference to improvements in fish screens for water chutes, such as canals or irrigating ditches, and is designed to provide a means whereby fish are prevented from following the course of the water, but floating trash caught by the screens is periodically removed, so that the screens do not become choked.

The invention is particularly useful in connection with irrigating ditches, to be installed at the intake end of such ditches, so that fish may not get into the ditches to be ultimately stranded where the water is distributed over the land.

In carrying out the invention, the screen is so mounted as to be reversible and mechanism responsive to the flow of the water is connected to the screen in such manner as to quickly reverse the screen at suitable intervals in a manner to present the reverse side of the screen to the on-coming water from that first presented, so that collected debris will be washed away from the screen, but the movement of reversal is sufficiently rapid to prevent fish from passing by the screen.

The invention will be best understood from a consideration of the following detailed description taken in connection with the accompanying drawings forming a part of this specification, with the understanding, however, that the invention is not confined to the particular structure illustrated, since the showing of the drawings is more or less indicative and the invention is susceptible of various modifications without sacrificing any of the salient features of the invention.

In the drawings:—Figure 1 is a vertical longitudinal section of a structure embodying the present invention. Fig. 2 is a section on the line 2—2 of Fig. 1 but drawn to a larger scale. Fig. 3 is a section on the line 3—3 of Fig. 1, on a scale similar to that of Fig. 2.

Referring to the drawings, there is shown a chute 1 which may be installed at the intake end of a canal or ditch, preferably one designed for irrigating purposes where the water is ultimately distributed over the land, and if fishes should pass from the main supply stream to the irrigating ditch or canal, there is a likelihood that such fishes would ultimately be killed by being stranded where the water spreads out over the land.

While a chute such as indicated at 1 may be installed in a ditch or canal, it will be understood that the chute of the drawings may indicate the ditch or canal itself, and the parts which are ordinarily mounted on the chute may be otherwise mounted.

At one end of the chute 1 there is shown a gate 2 moving in guideways 3, so that the inflow of water may be regulated or stopped or started, as desired, the flow of water being in the particular showing of the drawings from the left end toward the right end of Fig. 1.

At an appropriate distance from the intake gate 2, there is mounted a rack bar 4 held by guide brackets 5 fast to the corresponding side of the chute 1 by bolts 6 which may traverse slots 7 in the ends of the brackets, so that the latter can be adjusted as needed, each bracket being provided with a finger 8 in overhanging relation to that edge of the rack bar 4 remote from the teeth thereof.

Mounted on opposite sides of the chute 1 are plates 9, 10, respectively, the plate 9 being outset a short distance from the corresponding wall of the chute. In these plates are formed bearings for arbors 11 on the opposite ends of screen frames 12, these frames carrying wire meshes 13 of appropriate gage. The arbors 11 traversing the plate 9 are continued beyond the same toward the side of the chute, and there each arbor carries a pinion 14 in mesh with the teeth of the rack bar 4. In the particular structure shown, two screens 12 in superposed relation are indicated, but it will be understood that a single screen 12, or more screens may be used in accordance with the depth of the ditch and the conditions to be met.

Mounted on the side of the chute 1 corresponding to that carrying the brackets 5 is a post 15 held to the chute by bolts 16 which may traverse a slot 17 in the post, so that the height of the post may be varied, and this post extends above the top of the chute and there carries a rock lever 18 acting as a walking beam, being connected to the post by a pivot pin 19. Fast on the lever 18 and extending to opposite sides of the pivot 19, is a trough 20 held to the walking beam by supports 21. The trough 20 carries a ball 22 of sufficient weight for a purpose which will presently appear.

Fast to the same side of the chute 1 as is the post 15, but on the side of the post remote from the rack bar 4, is a plate 23, in which there is formed a bearing for one end of a shaft 24, the other end of which is journaled in a plate 25 fast to the other side of the chute. The plate 23 also carries a stud 26 on which is mounted a gear wheel 27 meshing with a pinion 28 on the corresponding end of the shaft 24. Fast on the shaft 24 are hubs 29 in spaced relation one to the other, and these hubs carry radial arms 30 recessed at the outer ends, and in these recesses are seated blades 31. In the particular structure shown in the drawings, there are four pairs of arms 30 and four blades 31, the blades being in traversing relation to the chute, and so disposed as to be impelled by water traversing the chute, such water engaging the blades as they reach the lower position. One arm of the gear wheel 27 has fast thereto a pin 32 traversing a slot 33 in one end of a link 34, the other end of which is pivotally connected to the corresponding end of the walking beam 18, as indicated at 35, while the rack bar 4 at the upper end is pivotally connected to the other end of the walking beam, as indicated at 36.

Let it be assumed that the members are in the position shown in Fig. 1 with the rack bar 4 in the lowermost position, and the screens 12 in engagement at their meeting edges, these edges being in overlapping relation, so that rotative movement of the screens is stopped when this relation is established. On opening the gate 2, water will flow through the chute from left to right as viewed in Fig. 1 and will traverse the screens, but the height of the water is assumed to be less than the combined height of the screens. As the water flows through the screens, more or less floating material is arrested by the screens, and, of course, fish are unable to traverse the screens. The onflowing water engages the blades 31 and causes a rotative movement of the shaft 24 in a counter-clockwise direction as viewed in Fig. 1. This motion is transmitted by the pinion 28 to the gear 27, and the latter is rotated in a clockwise direction as viewed in Fig. 1. Ultimately the pin 32 is brought into engagement with the lower wall of the slot 33, as viewed in Fig. 1, and then the link 34 participates in the further rotative movement of the gear 27, thus lowering the corresponding end of the rock lever or walking beam 18. As soon as this walking beam has passed the horizontal position, gravity acts on the ball 22 to cause it to move toward that end of the trough 20 toward the link 34, and the weight of this ball is sufficient to rock the walking beam 18 rapidly, so that the movement of the screens 12 caused by the initial movement of the walking beam through the rack 4 is rapidly completed, and the screens are again brought together with their edges in overlapping relation, but the edges now overlapping are those which were outermost before, and those faces of the screens which were presented toward the gate 2 are now presented in the other direction, with the water flowing through the chute traversing the screens in the reverse direction to that first considered. Any floating material arrested by the screens when in the initial position is now washed away by the flowing water, but the movement of the screens has been sufficiently rapid to prevent the passage of fish which if close to the screens on the initial movement thereof would be driven away and the screens will be closed before the fish would return. The continued movement of the blades 31 under the action of the water impart like continued movement to the gear 27, and now the pin 32 moves along the slot 33 without action on the link 34, so far as the walking beam 18 is concerned. Ultimately the movement of the pin 32 brings it into engagement with the upper end wall of the slot 33, and then the link 34 is lifted to reverse the rocking movement of the walking beam until the horizontal is again reached and passed, when the ball 22 will roll toward the first end of the chute returning the walking beam rapidly to its initial position and bringing the screens 12 to their initial position, when any collected matter will be washed away by the action of the water traversing the screens in the reverse direction.

By the structure described, the flow of water causes a periodic reversal of the screens and a cleansing thereof, so that these screens cannot become choked even when considerable amounts of floating matter are carried into the chute, and the agitation of the water by the movements of the screens will frighten fish from the neighborhood.

By reason of the lost motion between the pin 32 and the link 34 there are considerable periods of rest for the screens between the active movements, and by properly proportioning the parts, the reversal of the screens may be at comparatively infrequent intervals, thus preventing undue wear on the structure. The rapidity with which the screens move from one position of closure to the other position of closure will depend upon the relative proportions of the slot in the link 34 and the gear wheel, and the weight 22 serves as a gravity means for locking these screens in either of the closed positions. The movement of the paddle wheel made up of the blades 31 and shaft 24 is comparatively regular, while the movement of the screens 12 is intermittent and comparatively rapid.

By making the end of the rack bars 4 where connected to the walking beam 18 elongated and providing the same with perforations 37, and by making the link 34 sufficiently long and providing it with perforations 38, the relative movements of the parts may be variously adjusted.

What is claimed is:—

1. A fish screen for water chutes comprising reversible screen members, an actuating member movable steadily in one direction in response to a water stream, and lost motion connections between the impelling member and the screen and movable in opposite directions by the movement of the actuating member in one direction, said lost motion connections at each active movement causing a complete reversal of the screen members.

2. In a fish screen for water chutes, a flat screen frame journaled intermediately for reversal, a water wheel, and a lost motion connection between the water wheel and the screen, said connection being movable in opposite directions and at each movement causing a reversal of the screen frame.

3. In a fish screen for water chutes, a screen member journaled at the ends for reversal, a pinion carried at one end of the screen, a rack bar engaging said pinion, a rock lever connected to the rack bar, a link connected to the rock lever on the side of the fulcrum thereof remote from the rack bar, said link being provided with an elongated slot, a gear wheel having a pin entering the slot in the link, and a water wheel carrying a pinion meshing with the gear wheel, said water wheel being in position to be engaged by a stream of water traversing the screen.

4. In a fish screen for water chutes, a screen member reversible on an axis transverse to the water chute, a rock member connected to the screen member for causing its reversal, an actuating member responsive to the movement of a water stream traversing the screen and connected to the rock member, and a gravity member carried by the rock member for constraining the latter to either limit of its travel.

5. In a fish screen for water chutes, a reversible screen member, a water power actuating member, lost motion connections between the actuating member and the screen member, and means constraining the screen member to either limit of its movement.

6. In a fish screen for water chutes, a reversible screen member, a water power actuating member, lost motion connections between the actuating member and the screen member, and gravity means acting on the screen member for constraining it toward either limit of its movement.

7. In a fish screen for water chutes, a reversible screen member, a water power actuating member therefor, lost motion connections between the actuating member and the screen member and including a rock member, and gravity means carried by and acting on the rock member for constraining it toward either limit of its travel.

8. In a fish screen for water chutes, a reversible screen member, a water power actuating member, lost motion connections between the actuating member and the screen member and including a rock member, a trough carried by the rock member and extending to either side of its pivot point, and a gravity member in said trough movable to one end or the other thereof in accordance with the position of the rock member.

9. In a fish screen for water chutes, a screen member journaled at the ends for reversal about an axis transverse to the chute, a pinion carried at one end of the screen, a rack bar engaging said pinion, a rock lever connected to the rack bar and having an intermediate pivot support, a link connected to the rock lever on the side of the pivot support thereof remote from the rack bar, said link being provided with an elongated slot, a gear wheel having a pin entering the slot in the link, a water wheel carrying a pinion meshing with the gear wheel, said water wheel being in position to be engaged by a stream of water traversing the screen, a trough carried by the rock lever and extending to opposite sides of the pivot point of the rock lever, and a ball within said trough and movable by gravity to either end of the trough.

10. In a fish screen for water chutes, a reversible screen member, water impelled means for imparting initial movement to the screen member, and gravity means for completing such movement.

In testimony, that I claim the foregoing as my own, I have hereto affixed my signature in the presence of two witnesses.

BENJAMIN J. ROWLEY.

Witnesses:
J. K. VALENTINE,
D. G. ESTELL.

Copies of this patent may be obtained for five cents each, by addressing the "Commissioner of Patents, Washington, D. C."